July 25, 1933.  C. L. HALL  1,919,940
NUT FOR NUT AND SCREW FASTENED INSTALLATIONS
Filed Feb. 6, 1931
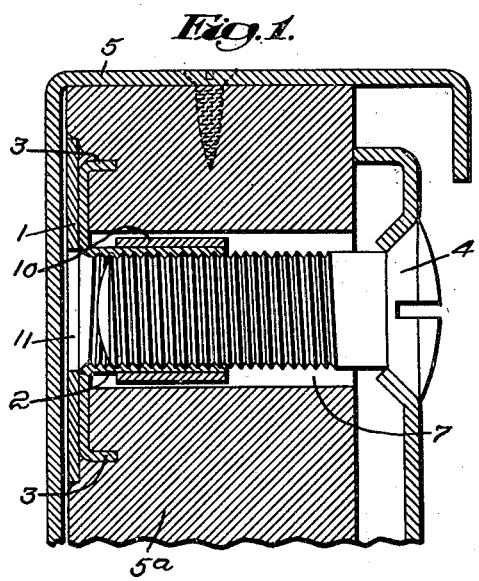
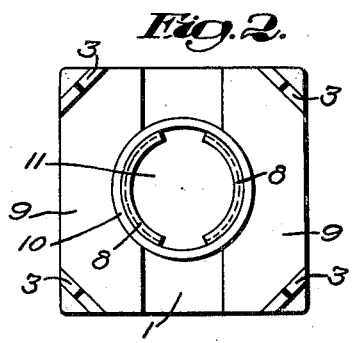
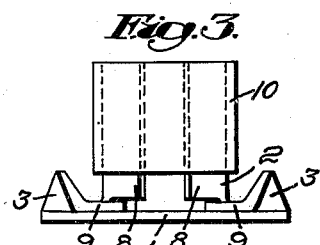
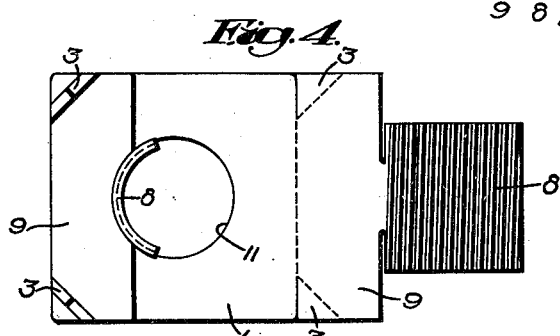
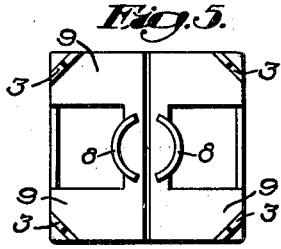
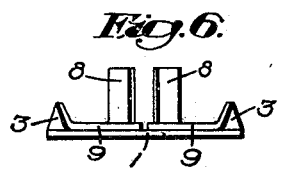
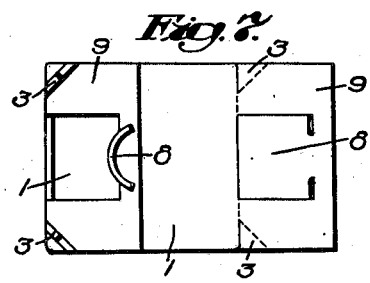
Inventor:
Charles L. Hall
by Emery, Booth, Varney & Townsend
Attys Patented July 25, 1933

1,919,940

UNITED STATES PATENT OFFICE

CHARLES L. HALL, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

NUT FOR NUT AND SCREW FASTENED INSTALLATIONS

Application filed February 6, 1931. Serial No. 513,854.

My invention aims to provide improvements in nuts for nut and screw fastened installations.

In the drawing which illustrates preferred embodiments of my invention:—

Figure 1 is a section through an installation showing my improved nut member as it appears when in use;

Figs. 2 and 3 include a plan and a side elevation of the nut shown in Figure 1;

Fig. 4 is a plan view of the nut shown in Figs. 2 and 3, one portion being folded and the other portion being shown prior to folding;

Fig. 5 is a plan view of a modified form of nut;

Fig. 6 is a side elevation of the nut shown in Fig. 5; and

Fig. 7 is a plan view of the nut shown in Figs. 5 and 6, one portion being folded and the other portion being shown just prior to folding.

In the particular embodiment of my invention selected for illustration by Figs. 1 through 4 of the drawing, I have shown a simple, durable and efficient nut formed from a single piece of metal. The nut illustrated is pressed from sheet metal and has a base 1 of double thickness, a hollow shank 2 threaded internally throughout its length and formed by two semi-circular portions. At intervals around the base 1, I have provided prongs 3 extending in the same direction as the shank 2.

In use, the nut cooperates with a screw 4 to secure two or more parts together. One use of the nut and screw is shown in Figure 1, in which a portion of the metal frame 5 of the door of a motor vehicle and a wooden piece 5ᵃ, commonly called the lock board, to which is attached the door lock 6 (a portion of which is shown), the remote control handle, the window regulator and the like. In this particular installation the shank 2 of the nut extends into a bore 7 in the board 5 and the screw extends through an aperture in the lock 6. During the attachment of the parts the shank of the screw 4 threads its way into the shank 2 of the nut and as the parts are drawn together the sharp pointed prongs 3 are forced into the wooden frame piece 5, thereby preventing rotation of the nut.

The nut shown in Figs. 1 through 4 is formed from sheet metal and is blanked out, as shown at the right-hand side of Fig. 4, so that it has to be folded into finished form, as shown at the left-hand side of Fig. 4 and in Figs. 2 and 3. For convenience the threads may be rolled into the thread-receiving portions prior to folding. During the folding operation the portions 8—8 are bent into semi-circular cross-section and then bent at right angles to the portions 9—9. Thereafter the portions 9—9 are bent inwardly from the edge of the base, as shown in Fig. 4, so that the semi-circular portions 8—8 are at a right angle to the base 1 to provide the shank 2. If desirable, a circular band 10 may be placed over the shank 2 to hold the semi-circular portions in proper relation and prevent them from spreading when the shank of the screw 4 is engaged therewith.

The prongs 3 are preferably bent at right angles to the base before the folding operation so that when the folding is completed they will extend from the folded portions 9—9 at the corners of the base, which is shown as being rectangular in outline. An aperture 11 is provided in the outer portion of the base (Figs. 1 and 4) to permit passage of the shank of the screw.

A cheaper form of sheet metal nut is shown in Figs. 5, 6 and 7. This nut is made in substantially the same manner as the nut described above, except that the metal for the semi-circular portions 8—8 is taken from the inwardly bent portions 9—9 of the base, as shown in Figs. 5 and 7. Thus less metal is required. If this nut is used with an installation so that the shank 2 engages the wall of the bore into which it fits a ring is unnecessary. There is no aperture in the base, because the structure will not permit it. Therefore, the screw used must have a shank short enough so that it will not contact with the base when it is engaged with the shank of the nut.

While I have illustrated and described preferred embodiments of my invention, I do not wish to be limited thereby, because the scope of my invention is best defined by the following claims.

What is claimed:

1. A sheet metal nut having a base of double thickness of metal formed by bending opposite edges inwardly toward the center of the base, a semi-circular threaded portion extending from each of said inwardly bent portions of the base and cooperating to provide a bolt receiving portion free of lateral extensions and locking means extending from the base of said nut for locking the nut against rotation when attached to a support.

2. A sheet metal nut having a base of double thickness of metal formed by bending opposite edges inwardly toward the center of the base, a semi-circular threaded portion extending from each of said inwardly bent portions of the base and cooperating to receive a bolt and a number of prongs bent from the inwardly bent portions of the base and extending in the same direction as the semi-circular portions to engage a support and prevent turning of the nut.

3. A sheet metal nut having a base of double thickness of metal formed by bending opposite edges inwardly toward the center of the base, a semi-circular threaded portion extending from each of said inwardly bent portions of the base and cooperating to receive a bolt and a number of prongs bent from the inwardly bent portions of the base and extending in the same direction as the semi-circular portions to engage a support and prevent turning of the nut, said prongs being located at the corners of the nut and being back-supported by the other portion of the base.

4. A nut formed from a single piece of sheet metal and having a base 1 having opposite edge portions 9—9 bent inwardly toward the center, an internally threaded boss 2 formed by two semi-circular portions 8—8 bent outwardly from the portions 9—9 and prongs 3 extending from said inwardly bent portions 9—9 to engage a support and prevent turning of the nut.

5. A sheet metal nut having a base, a pair of semi-circular internally threaded portions extending at right angles from said base and being opposed to each other to provide a hollow shank free from lateral projections to receive a bolt and a circular band encircling said semi-circular portions to prevent them from spreading when a bolt is threaded into engagement with said semi-circular portions.

6. A folded sheet metal nut having a base of double thickness of metal formed by bending opposite edges inwardly toward the center of the base, a semi-circular threaded portion extending from each of said inwardly bent portions of the base adjacent to the center of the base and cooperating to provide an internally threaded shank for receiving the threaded shank of a screw, said semi-circular portions being free of lateral extensions thereby to permit insertion of the shank into a simple bored hole.

CHARLES L. HALL.